(12) United States Patent
Storisteanu et al.

(10) Patent No.: US 6,976,209 B1
(45) Date of Patent: Dec. 13, 2005

(54) ACTIVEMARK MECHANISM IN A LIVE PARSING EDITOR

(75) Inventors: Adrian Storisteanu, Toronto (CA); Christine Nancy Knight, Toronto (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/291,147

(22) Filed: Apr. 15, 1999

(30) Foreign Application Priority Data

Sep. 10, 1998 (CA) .................................. 2246920

(51) Int. Cl.⁷ .......................................... G06F 17/30

(52) U.S. Cl. .................................................... 715/512

(58) Field of Search ............................... 707/512, 513; 715/501.1, 512, 513

(56) References Cited

U.S. PATENT DOCUMENTS

| | | | | |
|---|---|---|---|---|
| 5,671,427 A | * | 9/1997 | Nishimura | 707/509 |
| 5,761,079 A | * | 6/1998 | Drumm | 716/11 |
| 5,911,145 A | * | 6/1999 | Arora et al. | 715/514 |
| 5,973,696 A | * | 10/1999 | Agranat et al. | 345/760 |
| 5,987,480 A | * | 11/1999 | Donohue et al. | 707/501.1 |
| 5,999,912 A | * | 12/1999 | Wodarz et al. | 705/14 |
| 6,021,202 A | * | 2/2000 | Anderson et al. | 705/54 |
| 6,061,697 A | * | 5/2000 | Nakao | 715/513 |
| 6,122,647 A | * | 9/2000 | Horowitz et al. | 707/3 |
| 6,185,591 B1 | * | 2/2001 | Baker et al. | 715/531 |
| 6,266,681 B1 | * | 7/2001 | Guthrie | 707/501.1 |
| 6,295,542 B1 | * | 9/2001 | Corbin | 707/501.1 |
| 6,389,434 B1 | * | 5/2002 | Rivette et al. | 707/512 |

OTHER PUBLICATIONS

Bill Camarda, Using Microsoft Word 97, pp 27, 203-215, 232-253, and 251-530, Que Corporation, 1997.*
"LEXX", ECN User's Guide, Nov. 1996, "http://web.archive.org/web/*/http://www.ecnet.net/users/xwww/ecn/users.guide/vm/lexx.shtml", pp. 1-2.*
IBM "LPEX Editor User's Guide", Sep. 1998, International Business Machines Corporation, First Edition, pp. 1 and 23-24.*
Floyd, Paul, "EDM/2—A Look at EPM 6.0x", Jul. 1998, www.edm2.com, pp. 1-7.*
"Text Editing Productivity Improvement by Element Isolation", Jun. 1994, IBM Technical Disclosure Bulletin, vol. 37, Issue 6A, pp. 1-6.*
"Incrementally Imbedded Messages in an Edit View", Nov. 1995, IBM Technical Disclosure Bulletin, vol. 38, Issue 11, printed pp. 1-5.*
"LPEX User'Guide and Reference", Mar. 1996, IBM, Second Edition, pp. 1-37.*
Floyd, Paul, "EDM/2—Adding syntax highlighting to EPM", Jul. 1998, www.edm2.com, pp. 1-6.*

* cited by examiner

Primary Examiner—Sanjiv Shah
(74) Attorney, Agent, or Firm—Satheesh Karra, Esq.; McGinn IP Law Group, PLLC

(57) ABSTRACT

An activemark mechanism for a live parsing editor allows marks (labels) in text to be referenced or linked to any editor command, macro, or any external tool activated by the editor. The activemark mechanism includes a parsing mechanism which creates an activemark automatically when the document is loaded in the editor, and thereafter as a user enters information into the document by parsing the changes to the document as they are committed. The activemarks are dynamic in that their meaning and behavior are updated in the context of any external tool which is activated by the editor.

34 Claims, 5 Drawing Sheets

ACTIVEMARK MECHANISM IN A LIVE PARSING EDITOR

FIELD OF THE INVENTION

The present invention relates to document processing for a data processing system. More particularly, the present invention relates to an activemark mechanism for a live parsing editor.

BACKGROUND OF THE INVENTION

The concept of a mark is used in document processing systems, such as editors, to denote a label structure. In an editor, marks are typically used for setting bookmarks in the text and labelling text which is referenced by other tools, for example, source code which is referenced by compiler error messages. In the context of browsers for Internet applications, marks denote "hypertext" links, or are used to invoke a function such as an applet.

The conventional concepts of "mark" and "hypertext" are restrictive in their definitions and, as a consequence, have limited functionality in the context of today's data processing systems. Conventional mark and hypertext structures are static in both location and type, and comprise a tag which is hard-coded in the source file. Beyond responding to the click of a mouse, conventional mark and hypertext structures offer no real interactivity.

What is needed is a mechanism for "activemarks" which are dynamically set in a document using a programmable editor, and which provide the capability to dynamically link any pieces of text or locations in the edit view to any editor, or external, command.

SUMMARY OF THE INVENTION

The present invention provides an activemark mechanism for editors and other document processing systems. The activemark structure features the capability to bind commands to the mark. The activemark structure utilizes a parsing mechanism which creates activemarks automatically as the user opens a document, and thereafter as the user enters information into the document, by incrementally parsing changes to the document. The activemark mechanism is particularly applicable to programmable text editors or edit controls such as the IBM Live Parsing Extensible Editor (LPEX).

According to one aspect, the activemark mechanism provides the capability to link any piece of text with any editor command or macro, or via the editor to any external command, for example, editor-attached tools, system commands, and the like. Advantageously, the activemark mechanism is not limited to hard-coded labels in specifically-tagged source text, nor is the ativemark mechanism limited to hard-coded functionality, such as relocation links, references, or running an applet. The activemarks and their definition and behaviour are updated in the context of any external tool which is activated by the live parser.

According to another aspect, the binding of the activemark to a command does not need to be specified in the source file which is loaded in the editor. Furthermore, the document remains intact regardless of the activemarks which may be set throughout the edit session. According to the invention, the mark is set over, or linked to, a particular piece of text by a live parser and/or other external command(s) running off the editor, rather than being hard-coded in the text. Activemarks and their associated command(s) may also be set during the edit session by the user either manually, i.e. directly through the GUI (Graphical User Interface), or through actions/tools provided by the GUI.

The activemarks-setting (or activemarking) operation is first performed during the initial loading of a file in the editor during total parse, and thereafter, incrementally as triggered by user changes, or other operations, to the file. During the processing of a file, the activemarks are kept synchronized with the text being edited.

It is a feature of the activemark mechanism that the links are not necessarily static in type. The activemarks and their meaning or behaviour upon activation are updated in the context of any external tool activated by the live parser. For example, a source-code navigator will dynamically update the caller and callee (hereafter "called") references between marks set on the function headers and on the function calls.

A Hypertext Markup Language (HTML) editor (e.g. in an Internet browser) for HTML files implementing the activemark mechanism according to the present invention includes the functionality already supported for HTML files and their hard-coded and unique-command markup tags in addition to the features of the activemark mechanism. This editor may be, however, programmed to encode activemarks set up during the edit session as hard-coded tags in the document file.

According to another aspect, activemarks can be programmed to display in various ways, such as through highlighted fonts defined through foreground and background colours and style attributes (e.g. italics, bold, underscore, etc.), borders, bitmaps, etc., or drawn under control of the external command. Activemarks may also be programmed to display in a position in the edit view different from the location of the text associated with them.

In one aspect, the present invention provides a processing system for processing a document, the processing system comprises: (a) a programmable text processing module having means for loading the document and a parsing editor for initially parsing the document and thereafter incrementally parsing changes committed in the document; (b) a mark control module having means for setting a plurality of marks in the document, means for modifying the marks, and means for clearing the marks, and each of the marks comprising selected information in the document and means for linking the selected information with a command, the linking means being responsive to the operation of the parsing editor; (c) a graphical user interface module having means for displaying the document and means for controlling the display of the document; (d) an edit control module having means for controlling the text processing module, means for controlling the mark control module, and means for controlling the graphical user interface module.

In another aspect, the present invention provides in a document processing system having means for loading and storing a document, a parsing editor for initially parsing the document and thereafter incrementally parsing information entered in the document, and a graphical user interface for displaying the document, a method for generating marks in the document, the method includes: (a) selecting information for a mark in the document; (b) linking the selected information to a command, the linking operation being responsive to the parsing by the parsing editor; and (c) activating the mark in response to an activation input.

The present invention relates to Canadian Patent Application No. 2,246,920, filed on Sep. 10, 1998, and incorporated herein in its entirety by reference.

BRIEF DESCRIPTION OF THE DRAWINGS

Reference will now be made to the accompanying drawings which show, by way of example, preferred embodiments of the present invention, and in which.

DETAILED DESCRIPTION OF THE INVENTION

Figure 1:
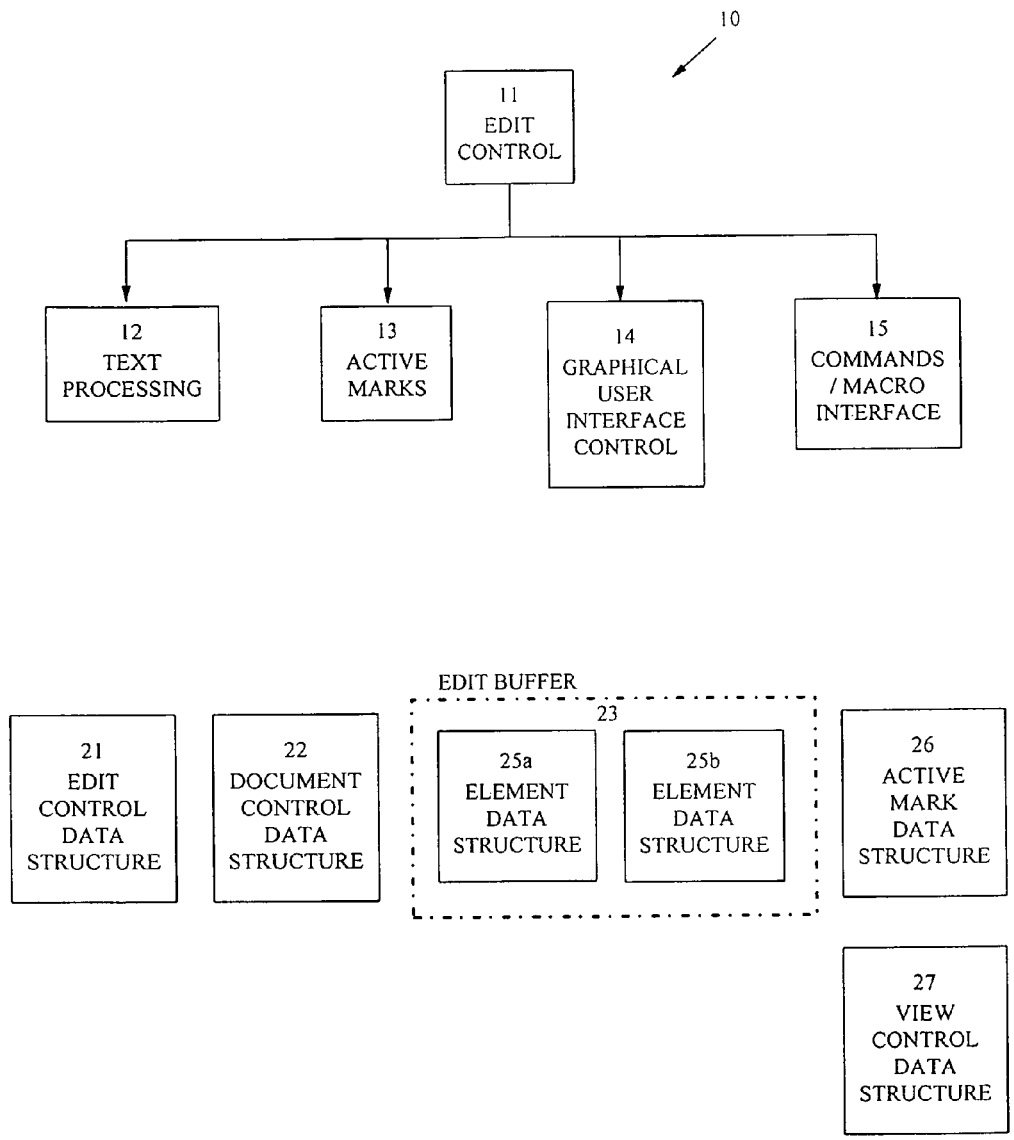
FIG. 1 is a block diagram of an edit system incorporating an activemark structure and live parsing mechanism according to the present invention.

Reference is first made to FIG. 1 which shows in block diagram form an edit system 10 for implementing an activemark mechanism according to the present invention. In the following description, the terms editor and edit system are used in a general sense to refer to any system to which this invention applies, be it a text editor, text processor, Internet browser, etc.

Referring to FIG. 1, the edit system 10 comprises the following principal functional modules: an edit control module 11, a text processing module 12, an activemarks module 13, a graphical user interface (GUI) control module 14, and a commands/macro interface module 15. During the editing of a document, the editor 10 maintains a series of data structures which include an edit control data structure 21, a document control data structure 22, an edit buffer 23, zero or more activemark data structures 26, and one or more view control data structures 27. As shown in FIG. 1, the edit buffer 23 comprises one or more element data structures 25, shown individually as 25a and 25b.

The edit control module 11 is responsible for the instantiation and management of the various components of the edit system 10. The functions of the edit control module 11 include processing internal edit system commands, handling the binding of internal commands or external commands and edit macros to menu items, key actions, mouse actions, etc. When an action is received, the edit control module 11 invokes the command, if any, bound to the action.

The text processing module 12 handles the loading of documents into the edit buffer 23 of the edit system 10. The functions of the text processing module 12 also include text editing operations and the formatting of the text, and the saving of the documents. The text processing module 12 records committed changes to the document in a stack for subsequent processing by a live parser which is registered in the edit system 10 for the document. The activemarks module 13 is called to respond to the changes in the text, such as to adjust the activemarks to newly-changed text and to invoke exit points of activemarks affected by alterations to the document text.

The activemarks module 13 handles the processing of marks and activemarks including setting, clearing, changes to the marks resulting from modification to the text, setting and activation of activemark commands and exit points. The functions of the activemarks module 13 are described in more detail below.

The principal functions of the graphical user interface control module 14 include controlling the document edit view control, and building and rendering the edit view. The graphical user interface module 14 manages the display attributes of the rendered elements as set up by the editor and its attached tools, for example, those set by the tokenization and colorization of the text by the live parser(s), non-document display-only elements and imbedded messages, the display attributes of activemarks, etc. Preferably, the graphical user interface control module includes the capability to show the contents of the edit buffer 23, i.e. the document, selectively by only including in the view those elements whose visibility matches the current settings.

The functions of the commands/macros interface module 15 include controlling the interface to internal and external commands and edit macros, including live, incremental, parsers. The commands/macros interface module 15 also loads and runs external commands and macros.

The edit control data structure 21 comprises a data structure which stores global data for controlling the edit system 10. The document control structure 22 stores document control data for controlling the operations on a document in the edit system 10. During the course of operation, several document controls will be created, one for each document.

The edit buffer 23 comprises a linked list of all the text elements which make up a particular document. For a document, classes are defined which broadly classify element types in the document. Classes are used to filter out elements from the view, and are also used by the parsers or external commands to interpret the edit buffer (i.e. the document) contents at various degree of detail. Each element can belong to one or more classes.

The element data structure 25 stores the text elements and the corresponding prefix area contents. In addition, the element data structure 25 contains formatting flags and display attributes and class information. The contents of a document comprise text elements which are loaded into the edit system 10. The display attributes for each character are usually set by the tokenizer in a live parser attached to the edit system 10.

The view control data structure 27 contains data related to the control of an edit view for one document in an edit system window. Such view control data includes display attributes defined for the view, the size of the view, the format of its displayed prefix area(s), the required visibility of elements (for filtering, e.g., zooming in/out of text), screen fields for the document view consisting of the particular area of the Edit Buffer that displays, etc.

The activemark data structure 26 contains the data associated with the activemark definitions. As will now be described, the activemark mechanism according to the present invention allows the linking or binding of any piece of text in the document with any editor command or macro. It is a feature of the activemark mechanism that the binding of the activemark to a command is not specified in the source file (i.e. the document) loaded in the edit system 10. Instead of being "hard-coded" in the text of the document, the activemark according to the invention is set over a particular piece of text by a live parser and/or other external command(s) running in the edit system 10. As will be described in more detail below, the binding of the activemark is performed first upon the initial loading of a document file in the edit system 10 during the total parse operation, and subsequently in response to user-entered changes or to other operations performed on the file. During the processing of the document file, the edit system 10 keeps the activemark(s) synchronized with the text being edited in the document. As will be described in more detail, the activemark mechanism also provides the capability to program the display of the activemarks in the document.

One or more live parser(s) may be attached to the edit system 10 for a document. A parser first gets control after the file has been loaded into the edit system 10 (i.e. initial total parse), and thereafter it is called by the text processing module 12 following changes made to the document (i.e. incremental parse). The live parser, which is typically an external command, parses the edit document. The live parser sets display attributes for the text elements in the edit view according to the syntax of the document (e.g. token highlighting), records classes in the edit system 10 with information regarding various constructs found in the document (e.g. C-language function bodies), and sets up activemarks accordingly. The parser-set information is used by the edit system 10 to display the document in a view (e.g. colourized, filtered section of the source, activemark labels, etc.), by other tools attached to the edit system to obtain detailed information about the structure of the document in order to carry out context-sensitive actions, and by the parser itself as reference points for incremental parsing.

The activemark mechanism according to the present invention comprises a SET MARK.ACTION command, a QUERY MARK.ACTION command, and a MARK RUN command. A user utilizes the SET MARK.COMMAND command to turn a conventional mark into an activemark, i.e. set the command binding of a mark. It will be appreciated that as such conventional marks in the edit system 10 are a subset of activemarks.

The user utilizes the QUERY MARK.COMMAND command to determine which command(s) are bound to an activemark. The MARK RUN command is used to activate the command that is associated with the activemark.

An activemark is triggered, or invoked, either through an explicit command request or through a command bound to a particular key or key combination, for example, clicking a mouse button as described below with reference to FIGS. 4 and 5.

In response to selection of a particular key (or key combination), the activemarks module 13 in the edit system 10 will run the command(s) which are bound to the activemark(s) indicated. The editor or live parser profile may bind a particular key to the MARK RUN command, such as a left mouse button single click. When the user activates the activemark (that is, selects the key combination bound to the MARK RUN command), the command for the activemark modifies the mark's highlight font for visual feedback purposes, and carries out the bound command(s). Typically, such a selection key is bound to a generic activemark trigger command or macro, which will handle the activation of the activemark(s) at the active point in a uniform manner, and take the most appropriate action in the case there are overlapping marks at the current selection location, i.e. invoke the command of the top-most mark, or that spanning the smallest range of text selection, or present the user with a choice, etc.

Similarly, as an example, the mark-setting tools (e.g. editor macros) may register a callback for the initialization of the pop-up screen. When the pop-up menu is brought up, each tool is called to optionally add one or more appropriate menu item(s) for any of its activemarks that are set at the pop-up activation location.

Tools that are added/removed during the edit session will, through the QUERY and SET MARK.COMMAND commands, add to and restore an existing activemark command or series of commands, and similarly register and de-register the callbacks for the pop-up initialization.

Figure 2:
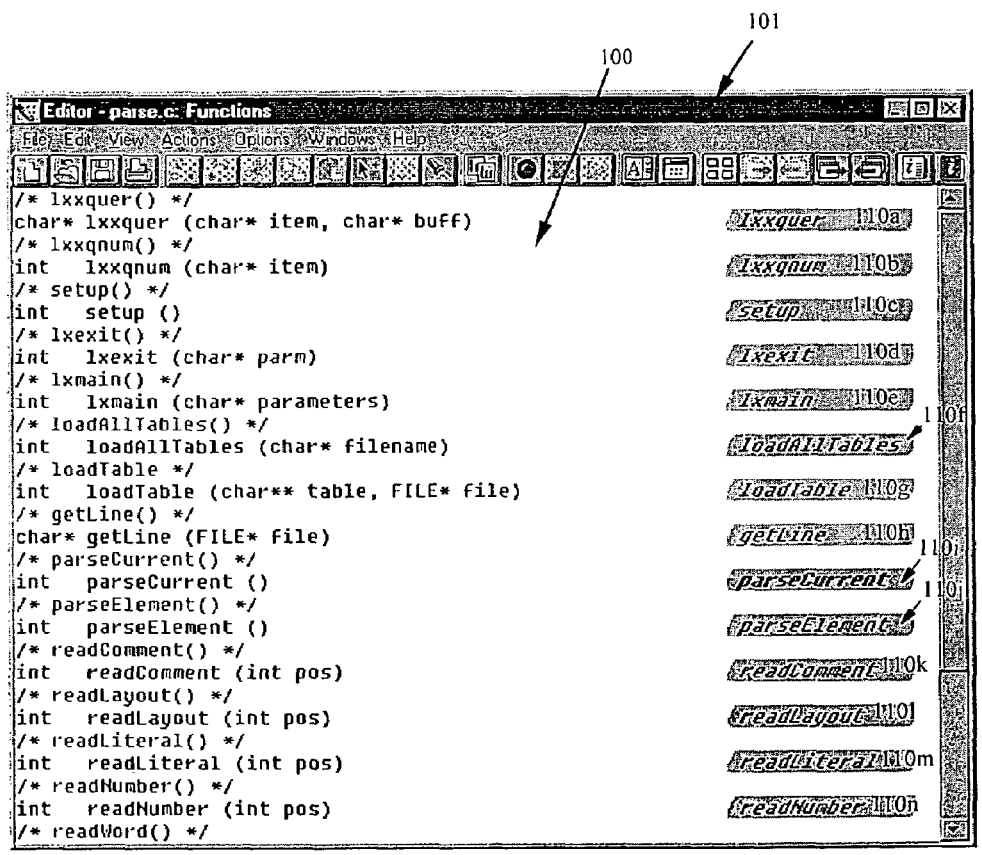
FIG. 2 is a schematic representation of a source file document opened in the edit system.

Reference is next made to FIGS. 2 to 5 which show a series of screen displays for a sample document in an edit system incorporating the activemark mechanism according to the present invention. In this example, the sample document as depicted in FIG. 2 comprises a source code computer program 100 written in the well-known C-programming language. As shown in FIG. 2, the source code program 100 has been loaded in the edit system 10 and is displayed in a window 101. The program file (i.e. document) 100 has been processed, i.e. parsed, by a live parser for C which is attached to the edit system 10. The initial processing by the live parser comprises the following operations: registering itself to the edit system 10 for incremental parsing; adding its own menu items for C-related user actions; tokenizing and colorizing the document 100 according to C-programming syntax and conventions; setting up an activemark for each function in the program module; and collapsing the view in the window 101 to only show the function headers for the source code program 100.

As shown in FIG. 2, the activemark for each function is displayed as a presentation label 110. The presentation labels 110, denoted individually as 110*a*, 110*b*, 110*c*, 110*d*, 110*e*, . . . , 110*n*, are set outside the associated text (i.e. the function names in the function headers) in the source code 100 and aligned on the right side of the window 101. The view of the source code program 100 shown in the window 101 serves as a function-level overview of the contents of the source code program 100, and provides a starting point for editing operations in the source code program 100. Preferably, the live parser sets the activemarks and associated commands in the various windows such that the same action trigger, e.g. clicking or double clicking the left mouse button, invokes the action which is most natural and expected by the user in the particular context.

Figure 3:
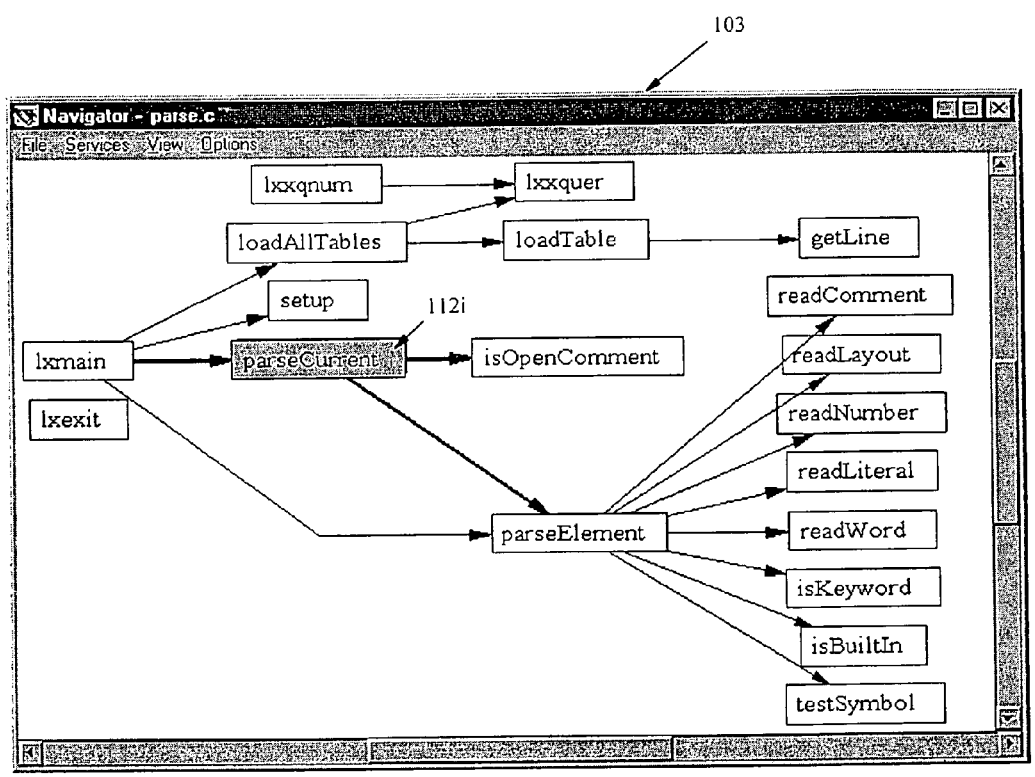
FIG. 3 is a diagrammatic representation of a view opened in the edit system by activating an activemark from the source file document of FIG. 2.

In operation, the live parser is continuously triggered in response to editing operations on the source code program 100 to keep the file tokenization current, and to add or remove activemarks as functions are added or removed from the source code 100. The commands associated with the activemarks in the window 101 shown in FIG. 2 are set to call a function in the live parser which opens a source function-navigator window 103 as shown in FIG. 3 and runs the commands associated with the particular activemark which has been activated. This feature serves to effectively chain activemarks in different windows (or levels of abstraction of the same source code) in the edit system 10.

For example referring back to FIG. 2, the user has clicked the label 110*i* associated with the activemark for the function parseCurrent( ). The commands associated with the activemark 110*i* for the function parseCurrent( ) include a command to highlight the presentation label 110*i* (as shown in FIG. 2), a command to open the function navigator window 103 as shown in FIG. 3, and a command to run the activemark for the parseCurrent( ) node in this window. As shown in FIG. 3, the activemark for the function parseCurrent( ) is run as if directly activated by the user, i.e. the activemark is displayed as a highlighted label 112*i*, and causes the system 10 to display a new edit view 105 for the function parseCurrent( ) as shown in FIG. 4.

Figure 4:
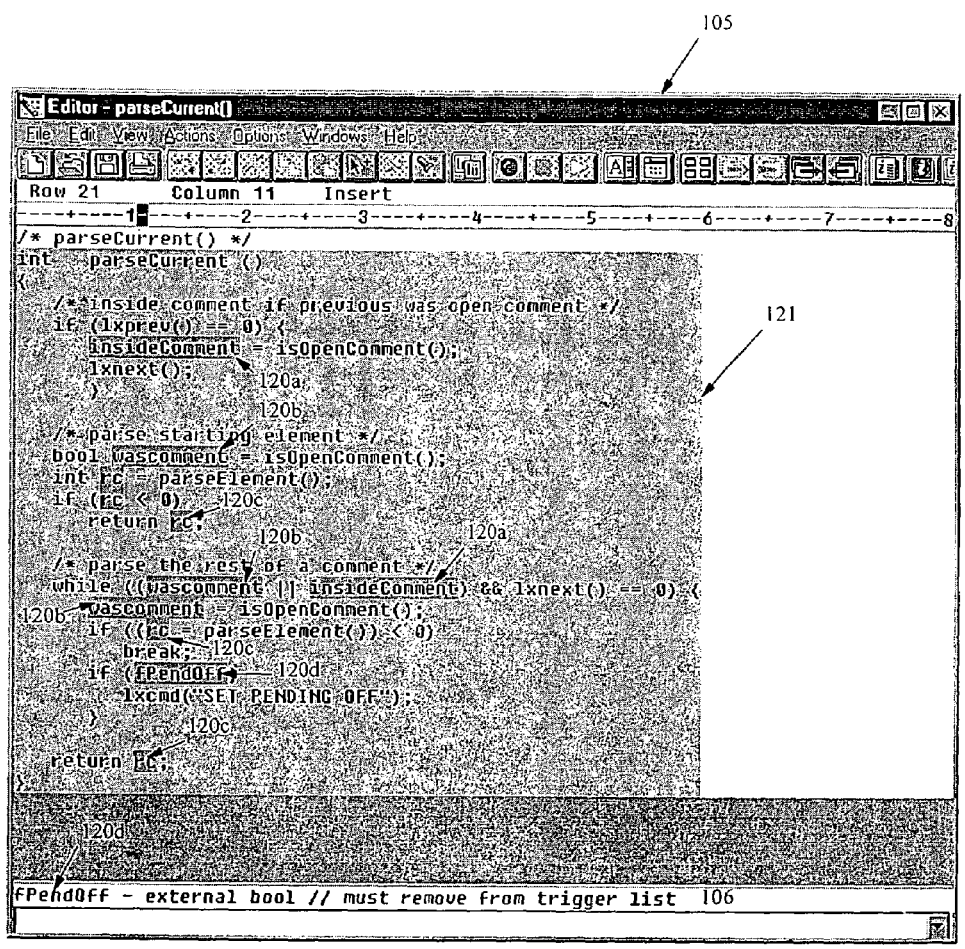
FIG. 4 is a diagrammatic representation of the activemarks set in a subsequent source view opened by the activation of the activemark from the source file document of FIG. 2.
Figure 5:
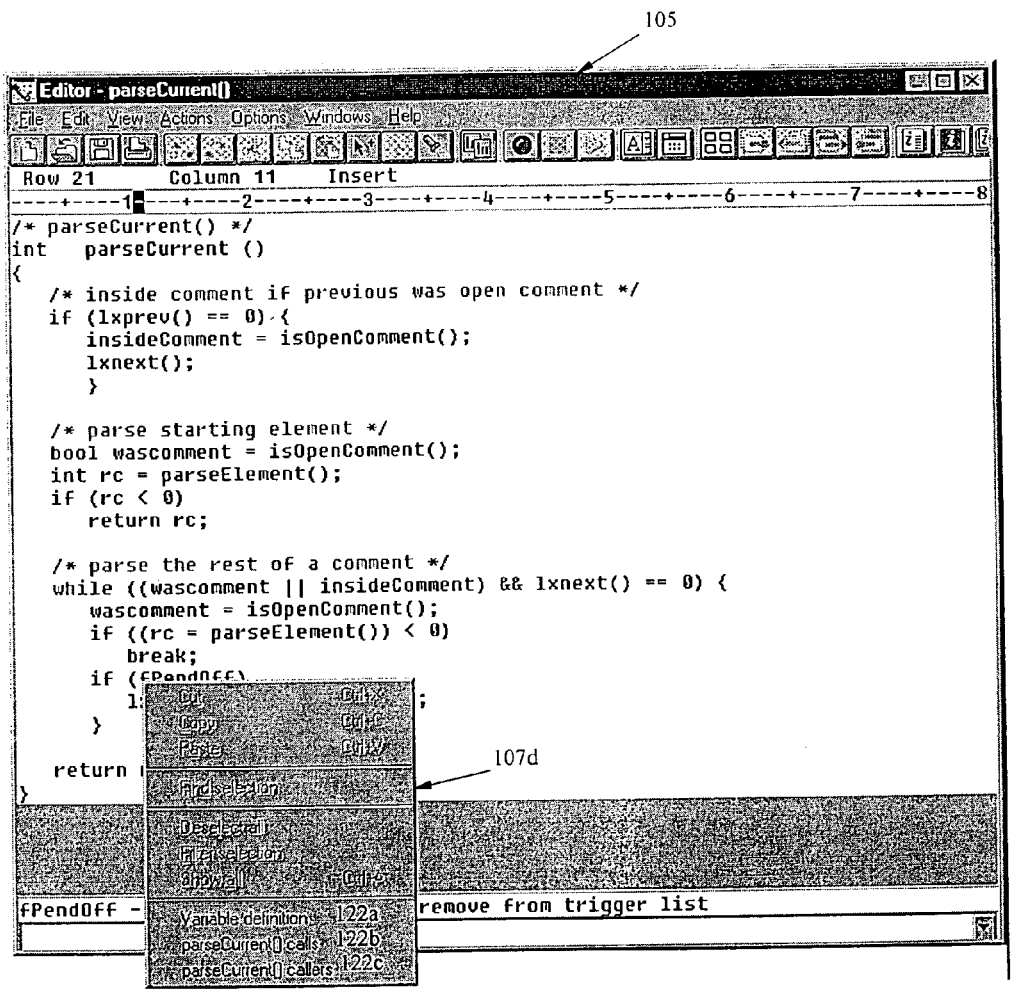
FIG. 5 is a diagrammatic representation of the commands bound to the activemark of FIG. 3 shown in a view pop-up screen which has been activated.

As shown in FIG. 4, the source code segment associated with the activemark for the function parseCurrent( ) is displayed in the edit view window 105, the code is tokenized by the C-language parser, and activemarks are set over the body of the function parseCurrent( ) (denoted by reference 121) and each variable accessed in this function (denoted by reference 120). Referring to FIG. 4, activemarks 120 and 121 are shown highlighted in relation to the rest of the text for explanatory purposes, and are not necessarily so highlighted by the parser. The variables in function parseCurrent( ) set as activemarks 120 include insideComment 120a, wascomment 120b, rc 120c, and fPendOff 120d. Moving the mouse pointer in this view over the variable activemarks 120 causes the command associated with the particular activemark 120 to display information about that variable in the message line 106 of the edit view window 105. The information associated with the activemarks about a certain item or segment of the source document, e.g. variable fPendOff 120d, can be queried and used by other tools attached to the edit system 10.

When the user activates the view pop-up over overlapping activemarks, the actions of all the activemarks at that location are displayed. Referring to FIG. 5, the available user actions associated with any of the activemarks 120 and 121 are displayed in a pop-up window 107. The pop-up window 107 is displayed by clicking, for example, the right button on the mouse with the mouse pointer positioned over the activemark 120 of interest. For example, the right button of the mouse is clicked with the pointer over the activemark for fPendOff 120d to display a pop-up window 107d with the actions associated with the variable 120d and function parseCurrent( ) 121. As shown in FIG. 5, the actions associated with the fPendOff activemark 120d comprise an object 122a for opening a view of the file where this external variable is declared, an object 122b for displaying a list of the functions called from parseCurrent( ), and an object 122c for displaying a list of the function calls to parseCurrent( ). Clicking one of the objects in these lists initiates other appropriate editing operations.

As another example, an interactive demo of an application, or interactive navigation through a document, may be set through an appropriate source file in conjunction with a live parser and text formatter that interpret the text as menu items, tables of contents, references to external commands, system utilities, etc.

The activemark mechanism is implemented in the form of several data structures or control blocks. The control blocks maintain information about the activemarks in the edit system 10. As will now be described certain mark-related information is part of other control blocks in the edit system 10 in order to facilitate handling the marks in the context of the edit session.

The main data structure or control block for an activemark takes the following form:

| mark control block | |
|---|---|
| ep1 | start of mark: pointer to text element cb (control block), |
| col1 | column |
| ep2 | end of mark: pointer to text element cb, |
| col2 | column |
| name | mark name |
| id | mark id |
| changed | flag to indicate mark changed |
| markCommand | command to run when the activemark is activated |
| menuMarkCommand | description of the activemark command |
| markv | list of mark visibility cb's |

-continued

| mark control block | |
|---|---|
| pfnMarkExit | notification entry point to be called on mark-changed and mark-deleted events for unnamed marks (set via an Application Program Interface, i.e. API, call) |

When the visibility attributes of a mark are changed from the default text display attributes in a particular edit view, a mark visibility control block with the new settings for this view is chained off the mark control block (cb). The mark visibility control block takes the following form:

| mark visibility | |
|---|---|
| next | pointer to the next mark visibility node in the list |
| view | pointer to the edit view cb |
| included | mark's text is explicitly included in the view |
| excluded | mark's text is excluded from the edit view |
| highlighted | mark's display is highlighted in the edit view |
| font | implementation-specific aggregate of mark display attributes in an edit view: font, font style and effects, background and foreground colours, border style, owner draw (presentation label is under external-command control) presentation label to be displayed instead of the mark's associated text range: text, or bitmap/icon handle relative/absolute location in the window when mark not displayed as part of the document text stream. |

In a linked-list of marks, a node is defined by a mark list data structure or control block which has the following form:

| mark list | |
|---|---|
| next | pointer to the next node in the mark list |
| mark | pointer to the mark cb. |

In the document control block, the mark-related information is contained in the following variables:

| marklist | mark list for the document |
|---|---|
| markChangedPending | mark list of changed marks pending notification |
| markDeletedPending | mark list of deleted marks pending notification |
| markDeletedCommand | command to be called for named marks removed from this document |
| markChangedCommand | command to be called for named marks changed in this document |
| lastMarkId | id of last-set unnamed mark |
| runningMarks | recursion depth of running activemarks |

When a new edit view is opened for a document, the new view inherits all the mark visibility characteristics and attributes (markv control block) of the originating edit view. The mark-related information in the view control is contained in the following variables:

| VIEW CONTROL BLOCK mark-related information | |
|---|---|
| filterMarks | true = consider mark include/exclude settings in this edit view (see the MARKS parameter) |
| includedMarks | there is at least one explicitly included mark in the edit view |

There are several edit system commands and parameters for handling marks as will be described in more detail below.

Certain commands have equivalent API (Application Programming Interface) function calls, depending on the implementation requirements or performance characteristics of the edit system incorporating the activemarks mechanism according to the present invention. While most API functions will consist of faster paths to the mark-handling commands indicated below, some additional functionality may be defined for the programming interface. For example, the display attributes of an activemark consist of several parameters, which are more suitable to be passed in via an API function call through an appropriate data structure (control block).

An external command, such as a live parser, will mostly use unnamed marks through the API, being provided access to the mark control block via a handle. Such a parser will set all its activemarks in the document, set up each mark's command to call the parser back with the appropriate parameters, and register the desired notifications on activemark text changes and deletions.

Now that an overview and functional aspects of the invention have been introduced and described, general pseudo code will be presented and described for functions and routines for implementing the activemark mechanism in an edit system 10 as described above.

The MARK commands are used to set, clear, modify, etc. activemarks and conventional marks, and run activemarks in the edit system 10. As will be described below, several parameters for the SET and GET editor commands are also utilized in the edit system 10 to handle marks. Other commands in the edit system 10 may optionally use or handle marks. For example, a navigational command, such as NEXT, may be used to advance the entry point to the next [active]mark in the document.

The MARK command is implemented as follows:

```
INPUT:   view        edit view cb
         parameters  the command string (particular
                     MARK command and parameters)
parse commandname, markname, parameters
document := view->document
dispatch process according to commandname (as will be described in more
detail below)
```

The MARK SET command is used to set an activemark, or a conventional mark, in a document. The MARK SET command takes the following form:

MARK SET<markname> [line1 [column1 [line2 column2]]] Command scope: document

The MARK SET command assigns the specified<markname> to a certain position or text in the document. If not specified, the ending location for the mark is assumed to be the same as the starting location. If no location is specified, then current entry position is taken. If the specified <markname> is already being used, it is reassigned. The activemarks or marks can be either named by the user, or assigned an ID by the edit system 10. A special value of <markname> of the form # sets a mark that will be referenced by its ID, which has the form #n, where n is a positive integer. The ID of the last mark created is queried using a command GET MARKID. For example, to create and use a mark referenced by its id, the following sequence of commands can be used:

```
// create an activemark on line 5, columns 3–9
mark set # 5 3 5 9
// get its activemark id (e.g., returns #123)
get markid.
// set its command
set markCommand.#123 mult ;editdic link % ;editproc open %
// run the activemark
mark run #123
```

A feature of the activemark mechanism is that no change (such as tagging) is needed in the processed source file, nor its extended attributes, or in another file associated with it. All the functionality is handled by the live parser(s) manipulating the document via the activemarks mechanism. It will be understood that the live parser(s) and/or associated editor tools can generate any or all of these if so desired by the specific application, such as adding functionality-equivalent tags to the saved source document, or saving the activemarks in the file extended attributes or in a separate file for the next edit session. The activemark mechanism is extensible and can handle documents of virtually any type. The MARK SET command is implemented as follows:

```
ep1        :=0     //document text element number line1
col1       :=0     //column1
ep2        :=0     //document text element numbered line2
col2       :=0     //column2
pMark      :=cb    of the mark identified by markname
                   in document->marklist
if pMark found     // if mark already exists, re-set it
                   setMark(view, pMark, ep1, col1, ep2, col2)
else               // if a new mark, add it to the document
                   addMark(view, markname, ep1, col1, ep2, col2)
return
```

The MARK FIND command is used to find a mark in the document, and takes the following form:

MARK FIND <markname>
Command scope: edit view

It sets the entry position to that noted by the specified<markname>. The MARK FIND command is implemented as follows:

```
pMark := cb (control block) of the mark identified by
    markname in document->marklist
cursorPosition := pMark->ep1, pMark->col1
redraw edit view (CURSOR_MOVED)
return
```

The MARK CLEAR command is used to clear a specified activemark or mark (i.e. <markname>), and takes the following form:

MARK CLEAR <markname>
Command scope: document

The specified mark is cleared and removed from all the marklists of the text elements associated with the mark. A mark-deleted notification is then issued. The visibility of one or more edit views may change as a result. The MARK CLEAR command is implemented as follows:

```
pMark:= cb of the mark identified by markname
    in document->marklist
if pMark found
    if pMark->ep1 != null
        markdeleted(document, pMark)
    clearMark(pMark)
    for all markv data structures chained off pMark
        if markv->included = true
            checkIncludeMark(markv->view)
    freeMark(document, pMark)
    markTriggerExits(view)
return
```

The MARK INCLUDE command is provided for making the selected mark visible and the MARK EXCLUDE command is provided for making a mark not visible. The MARK INCLUDE/MARK EXCLUDE commands take the following form:

MARK INCLUDE <markname> [ON/OFF]
MARK EXCLUDE <markname> [ON/OFF]
Command scope: edit view The selected activemark is made visible, i.e. exclusively displayed, in the edit view according to conceptual relatedness, e.g. type of activemark, or by originating parser when several live parsers are attached simultaneously to the same document. When one or more marks are INCLUDE'd in an edit view, only the text ranges or labels of these marks are displayed. The text for an EXCLUDE'd mark text is not displayed in the current edit view. The MARK INCLUDE/MARK EXCLUDE commands are implemented as follows:

```
markv := getMarkV(view, markname)
if INCLUDE
    markv->included := ON/OFF
    if ON
        view->includedMarks := true
    else
        checkIncludeMark(view)
else
    markv->excluded := ON/OFF
redraw edit view (VIEW_CHANGED)
return
```

The MARK SETFONT command is provided to associate display attributes with the mark, in order to highlight it in the edit view. The MARK SETFONT takes the form:

MARK SETFONT <markname> [<font>]
Command scope: edit view

The parameter <font> is an aggregate of display attributes, which is implementation-specific and platform-specific. If not specified, the mark is unhighlighted, i.e. the display attributes of its text range are restored to those of the regular text in the particular edit view. The MARK SETFONT command is implemented as follows:

```
markv := getMarkV(view, markname)
if no font
    markv->highlighted := false
else
    markv->font := font
    markv->highlighted := true
if markv->highlighted changed or original markv->font!=font
    redraw edit view (VIEW_CHANGED)
return
```

The MARK RUN command is provided to activate an activemark, which involves running the command(s) associated with the particular activemark. The MARK RUN command takes the following form:

MARK RUN [<markname>]
Command scope: document

If no <markname> is specified, the last mark created is taken. To prevent infinite recursion by one activemark running other activemarks, being called back, and so on indefinitely, a certain maximum call depth is set. The activemark name is appended to the end of the command string (for identification), and the command is invoked.

The editor or live parser profile will commonly bind a key, key combination, or mouse action, such as the left mouse button single click, to a generic activemark trigger command or editor macro, which will handle the activemark activations for a document in a consistent manner. An explicit command request, such as from a menu pull-down, from a tool or parser calls the same activemark trigger. The activemark trigger searches for the activemark(s) at the current entry point and runs the associated command(s). Where there are overlapping marks at the active entry point, the most appropriate action is taken to either invoke the command of the most specific activemark (that spanning the smallest text range), or invoke the commands of all the activemarks at that location in a certain order, or present the user with a choice. When MARK RUN is invoked, the activemark command first modifies the mark's highlight for visual-feedback purposes, and then performs the rest of the operations associated with the mark. The MARK RUN command is implemented as follows:

```
if no markname
    markname := "#" + document->lastMarkId
pMark := cb of the mark identified by markname
    in document->marklist
if pMark->markCommand != null
```

-continued
```
if document->runningMarks < maximumRunningMarks
    increment document->runningMarks
    editorCommand(view, markCommand + " " + markname)
    decrement document->runningMarks
```

The SET command sets, and the GET command queries, a particular edit system parameter. Depending on the specific edit system, these editor settings for manipulating marks can be implemented as separate commands or additional options to the MARK command detailed above. The SET MARKS ON/OFF command takes the following form:

SET MARKS ON/OFF
Parameter scope: edit view

The SET MARKS ON/OFF command activates/deactivates the interpretation of MARKINCLUDE and MARKEXCLUDE settings for visibility purposes in the edit view. When the setting is modified, the view is redrawn accordingly. The edit view draw functions consider this setting for purposes of including/excluding certain marks from the display. The SET MARKS ON/OFF command is implemented as follows:

```
edit view's filterMarks := ON/OFF
redraw edit view (VIEW_CHANGED).
```

The command GET MARK is provided for returning the current setting of the MARKS parameter, and takes the following form:

GET MARKS
Parameter scope: edit view

The GET MARKS command is implemented as follows:

return edit view's filterMarks

The GET MARKINCLUDE/MARKEXCLUDE commands return the visibility of a mark as set with the MARK INCLUDE/EXCLUDE commands, and takes the form:

GET MARKINCLUDE.[<markname>]
GET MARKEXCLUDE.[<markname>]
Parameters scope: edit view The GET MARKINCLUDE/MARKEXCLUDE commands are implemented as follows:

```
if no markname
    markname := "#" + document>lastMarkId
pMark := cb of the mark identified by markname
    in document->marklist
```

```
    markv := markv chained off pMark for current edit view
    if markv found
        return markv->included/markv->excluded.
```

The command GET MARKFONT is provided to determine the current display attribute settings of a mark, and takes the following form:

GET MARKFONT.[<markname>]
Parameter scope: edit view

The GET MARKFONT command is implemented as follows:

```
if no markname
    markname := "#" + document->lastMarkId
pMark := cb of the mark identified by markname
in document->marklist
    markv := markv data structure off pMark for current edit view
    if markv found
        return markv->font display attributes aggregate information.
```

The command GET MARKID is provided to determine the ID of a specified mark. The GET MARKID command takes the following form:

GET MARKID.[<markname>]
Parameter scope: document

To get the ID of a newly created mark, the <markname> parameter is not specified. The GET MARKID command is implemented as follows:

```
if no markname
    markname := "#" + document->lastMarkId
pMark := cb of the mark identified by markname
    in document->marklist
if pMark found
    return "#" + pMark->id.
```

The command SET MARKCOMMAND is provided to set the command binding of a mark in the document, turning the regular mark into an activemark, and the GET MARKCOMMAND is provided to get the command(s) bound to an activemark. These commands take the following form:

SET MARKCOMMAND.[<markname>] [command [parameters]]
GET MARKCOMMAND.[<markname>]
Parameter scope: activemark Once the command string is set for an activemark, the existing or pre-set command string may be queried, altered as needed, and set back for the activemark by another external editor utility or parser. In this manner, several commands may be chained off one activemark. If no command string is passed for SET MARKCOMMAND, the activemark is disabled and restored to a regular mark. The SET/GET MARKCOMMAND commands are implemented as follows:

```
if no markname
        markname := "#" + document->lastMarkId
pMark := cb of the mark identified by markname
in document->marklist
set/return pMark->markCommand
```

The commands SET MENUMARKCOMMAND and GET MENUMARKCOMMAND are provided for setting and getting a menu item string describing the activemark command which is to be added on a pop-up menu (for example, pop-up menu 107 shown in FIG. 5) for an edit window for a user-activated activemark command. These commands take the following form:

```
SET MENUMARKCOMMAND.[<markname>] [menu]
GET MENUMARKCOMMAND.[<markname>]
Parameter scope: activemark
```

The SET MENUMARKCOMMAND command is particularly useful in situations where there are several overlapping marks. Alternatively, this command string may be used as "flyover" help.

```
if no markname
        markname := "#" + document->lastMarkId
pMark := cb of the mark identified by markname
in document->marklist
set/return pMark->menuMarkCommand
```

If no command string is passed for SET MENUMARKCOMMAND, the string is cleared.

The commands SET MARKDELETEDEXIT and GET MARKDELETEDEXIT are provided to set and get the command to be called upon removal of marks in the document. The commands take the following form:

```
SET MARKDELETEDEXIT command [parameters]
GET MARKDELETEDEXIT
Parameter scope: document
```

The commands are implemented as follows:

```
set/return document->markDeletedCommand
```

A mark is removed by the MARK CLEAR command, or as text is deleted from the document.

The commands SET MARKCHANGEDEXIT and GET MARKCHANGEDEXIT are provided to set and get the command to be called when the text associated with a mark in the document is first changed. These commands take the following form:

```
SET MARKCHANGEDEXIT command [parameters]
GET MARKCHANGEDEXIT
Parameter scope: document
```

The SET MARKCHANGEDEXIT and GET MARKCHANGEDEXIT commands are implemented as follows:

```
set/return document->markChangedCommand
```

The command GET MARKLIST is provided for retrieving a list of the named marks set in the document. The command takes the following form:

```
GET MARKLIST
Parameter scope: document
```

The GET MARKLIST command is implemented as follows:

```
string = ""
for all marks in document->marklist
    if mark->name!=null
        string:=string + mark->name+""
return string
```

The command GET MARKRANGE is provided to retrieve the text range, i.e. starting and ending positions, of the specified mark. The command takes the following form:

```
GET MARKRANGE.[<markname>]
Parameter scope: document
```

The GET MARKRANGE command is implemented as follows:

```
if no markname
        markname:="#"+document->lastMarkId
pMark:= cb of the mark identified by markname
in document->marklist
return spring composed of
        0/pMark->ep1->elementNumber,
        pMark->col1,
        0/pMark->ep2->elementNumber,
        pMark->col2.
```

The following MARK-processing routines are called by the MARK command, by the SET/GET commands for mark parameters, by mark-handling API (Application Programming Interface) functions, and by other mark-processing commands in the edit system 10.

The getMarkV routine retrieves the visibility aggregate of a mark for a particular edit view. If a visibility aggregate is not found for the specified view, then one is created. The getMarkV routine is implemented as follows:

```
INPUT:view - edit view cb
       markname - mark name
   pMark:= cb of the mark identified by markname
       in document->marklist
   for all markv data structures chained off pMark
       locate markv for this view (markv->view=view)
   if none found
       create a new one
       clear it
       link it in
   return markv
```

The markChange routine is provided to update the active-marks of a text element as a result of text alterations. The markChange routine is implemented as follows:

```
INPUT:view  - edit view cb
      ep    - test element changed
      col   - starting column change
      len   - length of change
      changetype - replace, insert, or delete
document:=view->document
for all marks in the text element ep marklist
    update mark structure depending on type of change, its range, and the
    range covered by the mark
        (starting text element, ending text element, and range of
        characters in the current text element)
    if whole mark delete/deleted from text element ep
        remove mark node from text element list & free it
    if whole mark delete
        markDeletedNotification(document, pMark)
        for all markv data structures chained off pMark
            checkIncludeMark(markv->view)
    else if (mark changed)
        markChangedNotification(document, pMark)
markTriggerExits(view)
```

The markChange routine is called by the text processing module 12 (FIG. 1) to handle activemarks affected by text operations. For wider-scope actions, i.e., those spanning several text elements, for example, a block delete operation, the markChange routine is called for each text element which is altered. As a result of the text edit operation, one or more mark(s) may have their range shifted, their text may have been altered, or mark(s) may have been completely removed. Accordingly, appropriate mark notifications are issued. The visibility of one or more edit views may also change as a result. When text elements are joined or split, the marks associated with these text elements are updated, and duplicates in the mark lists resulting from the operation are pruned.

The routine markDeletedNotification is provided for adding a specified mark to the document mark-deleted notifications pending list. The markDeletedNotification routine is implemented as follows:

```
INPUT: document - document cb (control block)
       pMark - pointer to cb of deleted mark
   find mark in document
   if found
       unlink mark cb from document->marklist
   else
       allocate & copy a mark cb
   link mark cb in document->markDeletedPending list.
```

The routine markChangedNotification is provided for adding a specified mark, if not yet changed, to the document mark-changed notifications pending list. The markChangedNotification routine is implemented as follows:

```
INPUT: document - document cb
       pMark - pointer to cb of altered mark
   if pMark->changed=false
       pMark->changed:=true
       allocate & copy a mark cb
       link mark cb in document->markChangedPending list
```

The routine markTriggerExits is provided for triggering the mark changed and mark deleted notification commands for all the marks in the document mark notification pending lists. The markTriggerExits routine is implemented as follows:

```
INPUT: view - edit view cb
document:=view->document
pMarkList:=document->markChangedPending
document->markChangedPending:=null
for all nodes in pMarkList
    pMark:=pMarkList->mark
    if pMark->name!=null
     if document->markChangedCommand!=null
      markExit(view, document->markChangedCommand,pMark->name)
     else
      if pMark->pfnMarkExit!=null
       notifyActivemark(document, pMark->pfnMarkExit,
           EXIT_MARKCHANGED, pMark)
     remove & free mark node from pMarkList
pMarkList:=document->markDeletedPending
document->markDeletedPending:=null
for all nodes in pMarkList
    pMark:=pMarkList->mark
    if pMark->name!=null
     if document->markDeletedCommand!=null
      markExit(view,document->markDeletedCommand, pMark-name)
     else
     if pMark->pfnMarkExit!=null
      notifyActivemark(document, pMark->pfnMarkExit,
          EXIT_MARKDELETED, pMark)
    free all pMark->markv data structures
    free pMark
    remove & free its node from pMarkList
```

The markTriggerExits routine is called by the MARK CLEAR command, and upon text editing operations. For all the named marks in the document mark pending lists, any registered mark-changed/mark-deleted command is called; for the unnamed marks in the lists, any registered entry point is called with the mark-changed/mark-deleted event notification.

The routine markExit is provided for appending the markname to the end of the command string for identification, and for invoking the command. The markExit routine is implemented as follows:

```
INPUT:view - edit view cb
      command - mark command registered
      markname - mark name
   if command !=null and markname !=null
       editorCommand(view,command+" "+markname)
```

The routine checkIncludeMark is provided for checking if there are any marks left with the INCLUDE flag set. If there are no such marks left, the includedMarks flag is reset in the edit view cb, so that all the text elements are displayed upon edit view redraw. The checkIncludeMark routine is implemented as follows:

```
INPUT:view - edit view cb
if view->includedMarks = false
    return
for all view->document->marklist nodes
    for all marklist->mark->markv data structures
        if markv->view=view and markv->included = true
            return
view->includedMarks := false
redraw edit view (VIEW_CHANGED)
```

The routine clearMark is provided for disassociating a mark from its text. The clearMark routine is implemented as follows:

```
INPUT:pMark - pointer to mark cb
if pMark->ep1 = null
    return
for all elements associated with mark (pMark->ep1 . . . pMark->ep2)
    find list node for pMark in the text element marklist
    if found
        remove & free node from the text element marklist
pMark->ep1 := null
pMark->ep2 := null
pMark->col1 := 0
pMark->col2 := 0
pMark->changed:= false
for all markv data structures chained off pMark
    if markv->highlighted = true
        redraw edit view (VIEW_CHANGED).
```

The clearMark routine removes the mark from all the marklists of the text elements associated with the mark, and clears the mark. The edit views in which the mark was highlighted are scheduled for redraw.

The routine freeMark is provided for freeing the storage associated with a mark, and removing it from the document list.

```
INPUT:document - document cb
    pMark - pointer to mark cb
if pMark->ep1 != null
    ClearMark(pMark)
find list node whose mark = pMark in document->marklist
if found
    remove & free node from document->marklist
    free all markv data structures chained off pMark
    free pMark
```

The freeMark routine disassociates the mark from its current text, and then removes the mark from the document marklist and its associate memory is freed.

The routine setMark is provided for adding a mark to the marklists of all the text elements that are associated with it.

```
INPUT:view - edit view cb
    pMark - pointer to a mark cb
    ep1 - starting text element
    col1 - starting column
    ep2 - ending text element
    col2 - ending column
if pMark->ep1 !null
    clearMark(pMark)
document:view->document
//text elements were specified
if ep1 !=null and ep2!null
    if order of ep1, ep2 not ascending
        swap them
    if order of col1, col2 in a single-element mark not ascending
        swap them
//determine starting and ending positions:
//-if no starting element specified, use current entry point
if ep1=null
    ep1 :=view->ep
    col1 :=view->cursorPosition
    ep2 :=null
//-if no ending text element specified, use start of mark
if ep2=null
    ep2 :=ep1
    col2:=col1
pMark->ep1 :=ep1
pMark->ep2 :=ep2
pMark->col1 :=col1
pMark->col2 :=co12
pMark->changed:=false
for all the text elements associated with the mark (ep1 . . . ep2)
    allocate a marklist node (pMarkList)
    pMarkList->mark:=pMark
    link it in at end of the text element marklist
```

If the mark is being re-set, the setMark routine first disassociates the mark from its previous text. The range of text associated with the mark is established based on the input parameters, and then the setMark routine adds the mark to the marklists of all the text elements in this range.

The routine addMark is provided for adding a mark to a document. The addMark routine is implemented as follows:

```
INPUT:view - edit view cb
    markname - mark name (for a named mark)
    ep1 - starting text element
    col1 - starting column
    ep2 - ending text element
    col2 - ending column
OUTPUT: pointer to the new mark cb
allocate mark cb (pMark)
initialize mark cb
allocate marklist node (pMarkList) pointing to pMark
document:=view->document
//assign id to the mark
increment document->lastMarkId
pMark->id:=document>lastMarkId
if markname = "#"
    markname:= "#" + document->lastMarkId
pMark->name:=markname
link in node pMarkList in document->marklist
setMark(view, pMark, ep1, col1, ep2, col2)
return pMark
```

The addMark routine allocates the mark cb (control block) and initializes the mark cb based on the input parameters. The addmark routine then adds the mark cb to the marklists of the document and the text elements associated with it.

The routine displayMarks is provided for handling the display of the marks during the screen build and paint update in the edit view. It will be appreciated that the displayMarks routine is implementation-specific and platform-specific, and the particulars of the routine will depend on the mark display features supported, the paint procedures employed, etc. In the implementation of the displayMarks routines, the various visibility and display attributes of the marks in the edit view for the update regions being painted are taken into consideration, including the following:

```
- view->filterMarks for the included/excluded marks
- the display attributes aggregate of each mark in the view
where mark->markv->highlighted is true:
    - font, font style and effects, foreground and background colours,
    border style for displaying the text associated with the mark, or
    - the overriding presentation label, displayed instead of the mark's
    associated text range: text, or bitmap/icon
    - the relative/absolute location in the window when the mark is not
    displayed as part of the document text stream: e.g., aligned
    vertically within the edit area or the start/end margin of the view
    - when the activemark label is displayed under the control of an
    external command (owner-drawn), the appropriate draw-request
    notifications are sent to the external command.
```

The routine initializeMarksPopup is provided for initializing the edit window popup with the menu items pertaining to any activemarks at the current entry point. The initializeMarksPopup routine is implemented as follows:

```
ep:=current text element
for all marks in the text element ep marklist
    if mark text range covers cursorPosition
        add a popup menu item mark->menuMarkCommand
```

In the case of several activemarks at the current entry point, the menu items may be added to the pop-up in a certain sorted order. The pop-up menu item ID for the user selection identifies the user choice, and is used to activate the appropriate activemark.

Next, implementation details for the commands/macro interface module 15 (FIG. 1) are considered. The commands/macro module 15 controls the interface to internal commands, external commands (e.g. C/C++/Java-written utilities) and editor macros (e.g. REXX-written or automatically generated by the keystroke-recorder), including live (incremental) parsers. The commands/macro module 15 loads, runs, and unloads external commands and macros.

Commands may be invoked in the edit system 10 by a user through a command line, from within macros and external commands (e.g. from a live parser in response to changes to the document text), upon other events being set such as notifications of changed/deleted activemarks, or upon the activation of an activemark (i.e. invocation of an activemark command). It will be appreciated that certain API (Application Programming Interface) functions may provide faster paths to the same functionality.

The command/macro module 15 parses a command string for the command name and its arguments. The command name is looked up to determine the location of the command; the API-registration of notifications for the change/deletion of an activemark may specify an entry point (callback) into the external-command utility that handles it (usually the one that created the activemark), which will be invoked at these junctures.

Invocation of a mark notification and activemark command causes the mark name to be appended to the command arguments string, or provides the activemark handle (i.e. a pointer to the mark control block), for purposes of identifying the event source.

The processing performed by the Commands/Macros interface 15 includes: (a) internal editor commands, and (b) external commands. The internal commands-processing comprises synonyms (aliases) resolution; internal editor command lookup; implicit SET/GET of editor parameters; and loading of editor macros. The external commands-processing comprises loading unloading (releasing) of editor external command dynamic-link libraries (DLL's) or shared libraries, and loading and releasing of a Java Virtual Machine (JVM) and the external command Java classes and objects; initialization of the external command, running it with the arguments supplied, sending it notifications of a new document being loaded in the editor, of exiting a document, and of the termination of the editor; termination & unloading of the external command upon editor exit, or certain signals and exceptions; and invocation of system commands (through a command shell).

The command/macro interface 15 also includes the editor API (Application Programming Interface) for the external commands to interact with the editor, such as get and set of editor parameters, invocation of commands, registration of notifications, memory management. The command/macro interface 15 maintains a list of external-command control blocks.

Each control block (cb) includes the name of the external command, handles to its DLL (Dynamic Link Library) and to its entry points, handles to its registered callbacks, the type of the external command and the interface it adheres to. The external-command cb list is also used for catching exceptions in the external command, including logging, graceful termination, unloading of the offending external command.

The command/macro interface 15 includes: an externalCommand function, a notifyActivemark function, a notifyDocExit function and a commandExit function.

The externalCommand function is invoked when a command is not found in the internal editor command tables, or as an implicit SET/GET editor parameter, or as an editor macro. The externalCommand function is implemented as follows:

```
INPUT: name - command name string
    arguments - command arguments string
if not found in the existing external-command cb list,
    find & load dynamic link library (DLL) named as specified
    determine interface type by entry points exported from the DLL,
    and, similarly, exported notification entry points (if any)
    create external-command cb and add to list
for non-Java editors, a secondary command processor handles
    Java external commands - instantiate the JVM, look for the
    class(es) required, initialize them, etc.
additional information regarding the execution of the external
    command may be specified, such as the type of execution from a
    secondary thread, etc.
allocate a user data area in the context of the document
if first invocation,
    first send external-command initialization notification/call external
    command initialization entry point
call the external command with any specified arguments.
```

The notifyActivemark function calls an API-registered activemark changed/deleted notification entry point in an external command. The notify activemark function is implemented as follows:

```
INPUT: document - document cb
    pfnNofity - entry point to call
        notification - type of event: EXIT_MARKCHANGED/
                        EXIT_MARKDELETED
    pMark - pointer to mark cb
    build a document-context control block
    call the external-command entry point pfnNotify with the
        type of event, and the mark handle (pMark)
```

The notifyDocExit function is invoked upon termination of a document in the editor to notify all the external commands that have registered to be notified of document terminations. The notifyDocExit function is implemented as follows:

```
INPUT: document - document cb
build a document-context control block
cursor through the external-command cb list for external commands that
    - are implicitly defined to receive document-termination
        notifications, and
    - those that have registered a document-termination entry point
send the document-termination notification/call the document-termination
entry point.
```

The commandExit function is used to terminate and unlink a specified external command. The commandExit function is called for all the external commands in the external-command cb list when the editor terminates. The commandExit function is implemented as follows:

```
INPUT: externalCommand - name of the editor external command
build a document-context control block
send an external-command terminate notification/call the
    external command termination entry point
release (i.e. unlink) the DLL, or
    destroy the Java external command object and release the JVM upon
        termination of all Java external commands
remove the external-command cb from the maintained list
```

The disclosed invention as embodied in a method, computer system and computer program product, is particularly applicable to the IBM live parsing extensible editor (LPEX) environment. Those skilled in the relevant art will appreciate that the invention is suitable and relevant to various computer system environments, which are appropriately programmed in accordance with the features described.

While the invention has been described in terms of several aforementioned embodiments, those skilled in the art will recognize that the invention can be practiced with modification within the spirit and scope of the appended claims.

What is claimed is:

1. A processing system for processing a document, said processing system comprising a plurality of modules on a signal-bearing medium that tangibly embodies a program of machine-readable instructions executable by a digital processing apparatus, said plurality of modules comprising:

a programmable text processing module having means for loading the document and a parsing editor for initially parsing the document and thereafter incrementally parsing changes committed in said document;

a mark control module having means for setting a plurality of marks in the document, means for modifying said marks, and means for clearing said marks, and each of said marks comprising selected information in the document and means for linking said selected information with a command, said linking means and said means for setting being responsive to an operation of said parsing editor without user intervention;

a graphical user interface module having means for displaying the document and means for controlling the display of the document; and an edit control module having means for controlling said text processing module, means for controlling said mark control module, and means for controlling said graphical user interface module.

2. The processing system as claimed in claim 1, further including a command interface module, said command interface module comprising means for linking commands internal and external to said processing system to one or more selected marks.

3. The processing system as claimed in claim 1, wherein said linking means includes means, responsive to inputs entered by a user through said graphical user interface module, for activating a command linked with said selected information.

4. The processing system as claimed in claim 1, wherein said mark control module includes means for changing the appearance of said mark in said document in response to activation of said mark.

5. The processing system as claimed in claim 1, wherein said edit control module maintains the selected mark synchronized with text being edited in the document.

6. The processing system as claimed in claim 1, wherein said linking means of said mark control module includes means, responsive to input entered by a user through said graphical user interface, for activating a command linked with said selected information.

7. The processing system according to claim 6, wherein said linking means selectively links any piece of text in the document with any of an editor command and macro, wherein such linking is unspecified in the document loaded in the parsing editor, and wherein said mark is set to a piece of text by at least one of said parsing editor and an external command running in the edit system.

8. The processing system as claimed in claim 1, wherein said means for setting comprises inserting marks into said document without user intervention in response to a parsing of said document.

9. The processing system as claimed in claim 1, wherein said parsing editor adds functionality-equivalent tags to a document without user intervention via the mark control module.

10. The processing system as claimed in claim 1, wherein the marks set into said document are present only during a document processing.

11. The processing system as claimed in claim 1, wherein said mark control module sets said plurality of marks solely as defined by said parsing editor.

12. The processing system as claimed in claim 1, wherein said document is parsed by a plurality of parsing editors, each of said plurality of parsing editors providing a unique functionality.

13. The processing system as claimed in claim 1, wherein each of said plurality of parsing editors binds different actions to the same activemark set in the document.

14. The processing system as claimed in claim 1, wherein said mark control module comprises a module capable of setting said marks in association with any of a plurality of parsing editors and any of a plurality of markup languages.

15. The processing system as claimed in claim 1, wherein said marks are defined dynamically by the parsing editor during parsing of the document.

16. The processing system as claimed in claim 1, wherein said marks are other than static and other than hard coded in said document.

17. The processing system as claimed in claim 1, said processing system comprising one of:
an aggregate of said modules stored on a standalone diskette to be inserted into a computer drive unit;
an aggregate of said modules stored on a server to be downloaded by a computer on a network;
a computer having said aggregate of module stored in a hard drive; and
a computer having said aggregate of modules stored in a program memory, said program memory providing instructions for execution of a current program by said computer.

18. The processing system as claimed in claim 17, wherein said mark control module comprises a module capable of setting said marks using at least two of a plurality of markup languages.

19. The processing system of claim 1 wherein said mark control module creates at least one data structure for each said set mark in said document, said least one data structure being maintained outside said document.

20. In a document processing system having means for loading and storing a document, a parsing editor for initially parsing the document and thereafter incrementally parsing information entered in the document, and a graphical user interface for displaying the document, a mechanism for creating an activemark comprising:
means for identifying selected information in the document; and
means for binding a command to said selected information, said means for binding and said means for identifying being responsive to the operation of said parsing editor without user intervention, and the activemark being created as said parsing editor parses the document.

21. The activemark mechanism as claimed in claim 20, further including means for modifying the appearance of said selected information in the document being displayed in response to activation of said activemark.

22. The activemark mechanism according to claim 20, wherein the activemark mechanism allows a selected activemark to be exclusively displayed in the edit view according to conceptual relatedness.

23. The activemark mechanism according to claim 22, wherein the activemark exclusively displayed in the edit view according to conceptual relatedness is by type of activemark.

24. The activemark mechanism according to claim 20, wherein said activemark is set to a piece of text by at least one of said parsing editor and an external command running in the edit system.

25. The document processing system of claim 20, wherein said activemark comprises an instantiation of at least one data structure that is maintained outside said document.

26. In a document processing system having means for loading and storing a document, a parsing editor for initially parsing the document and thereafter incrementally parsing information entered in the document, and a graphical user interface for displaying the document, a method for generating marks in the document, said method comprising:
selecting information for a mark in the document;
linking said selected information to a command, said selecting information and said linking operation being responsive to the parsing by the parsing editor without user intervention; and
activating said mark in response to an activation input.

27. The method as claimed in claim 26, wherein said command comprises a command internal to the processing system.

28. A data storage medium on which a computer program is recorded which, in combination with a general purpose computer loaded with an operating system and a parsing editor, equipped to read into memory and execute program data from the data storage medium to perform the method for generating marks in a document according to claim 27.

29. The method as claimed in claim 26, wherein said command comprises a command external to the processing system.

30. A data storage medium on which a computer program is recorded which, in combination with a general purpose computer loaded with an operating system and a parsing editor, equipped to read into memory and execute program data from the data storage medium to perform the method for generating marks in a document according to claim 29.

31. The method as claimed in claim 26, further including altering the appearance of said mark in the document in response to activation of said mark.

32. A data storage medium on which a computer program is recorded which, in combination with a general purpose computer loaded with an operating system and a parsing editor, equipped to read into memory and execute program data from the data storage medium to perform the method for generating marks in a document according to claim 31.

33. A data storage medium on which a computer program is recorded which, in combination with a general purpose computer loaded with an operating system and a parsing editor, equipped to read into memory and execute program data from the data storage medium to perform the method for generating marks in a document according to claim 26.

34. The document processing system of claim 26, wherein said mark comprises an instantiation of at least one data structure that is maintained outside said document.

* * * * *